United States Patent
Duffy

[15] 3,672,259
[45] June 27, 1972

[54] PRESSURE DISTRIBUTOR VALVE CONSTRUCTION FOR POWER STEERING GEAR MECHANISMS

[72] Inventor: James J. Duffy, Livonia, Mich.
[73] Assignee: Ford Motor Company, Dearborn, Mich.
[22] Filed: Nov. 17, 1970
[21] Appl. No.: 90,304

[52] U.S. Cl.................................................91/382, 91/466
[51] Int. Cl..........................................................F15b 9/10
[58] Field of Search............................91/368, 382, 466, 380

[56] References Cited

UNITED STATES PATENTS

| | | | |
|---|---|---|---|
| 3,218,937 | 11/1965 | Dettlof | 91/368 |
| 3,292,499 | 12/1966 | Duffy | 91/368 |

*Primary Examiner*—Paul E. Maslousky
*Attorney*—John R. Faulkner and Donald J. Harrington

[57] ABSTRACT

A valve mechanism for controlling pressure distribution to a fluid pressure operated servo motor in a power steering gear mechanism for an automotive vehicle comprising a simplified valve spool, a driver operated steering shaft, a relatively friction-free screw mechanism adapted to connect the steering shaft to driven portions of a steering system, the steering shaft including a torsion bar portion that yields upon application of steering effort to the steering shaft, a cam having a driving part connected to the steering shaft and a driven part connected to the valve spool for adjustably positioning the valve spool in response to deflection of the torsion bar portion, and a valve spring biasing the valve spool against the cam surface of said cam connection thereby establishing a zero backlash condition.

8 Claims, 6 Drawing Figures

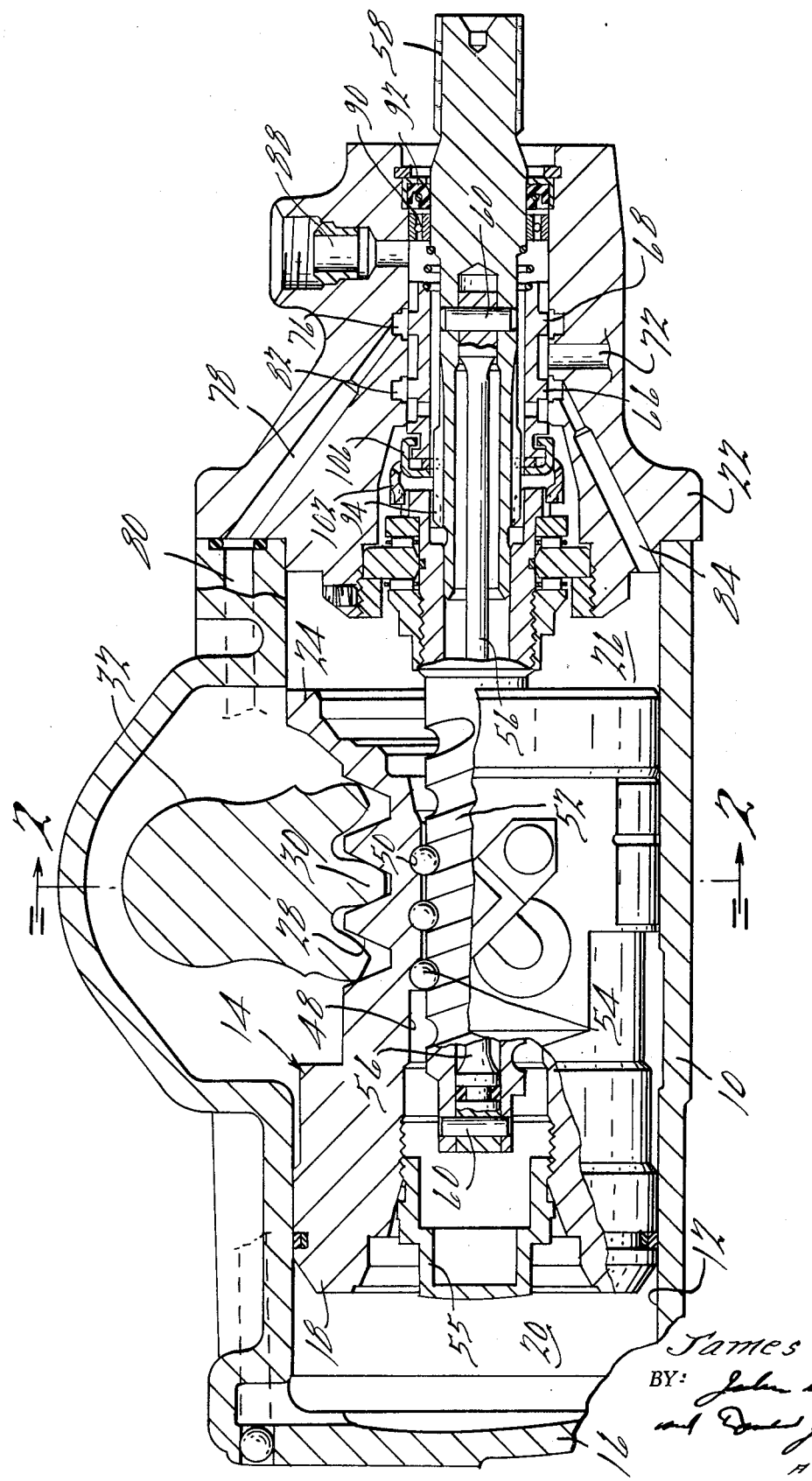

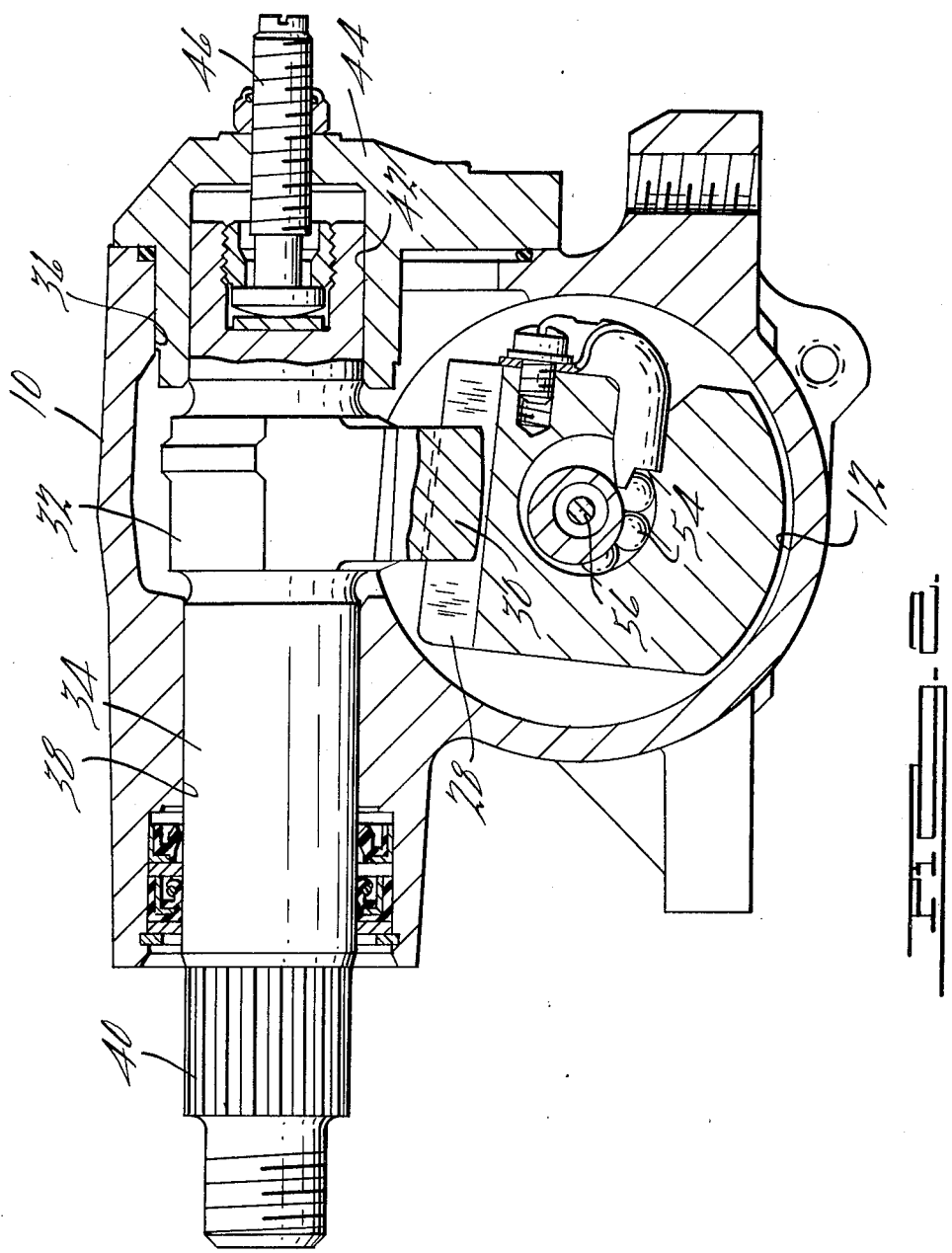

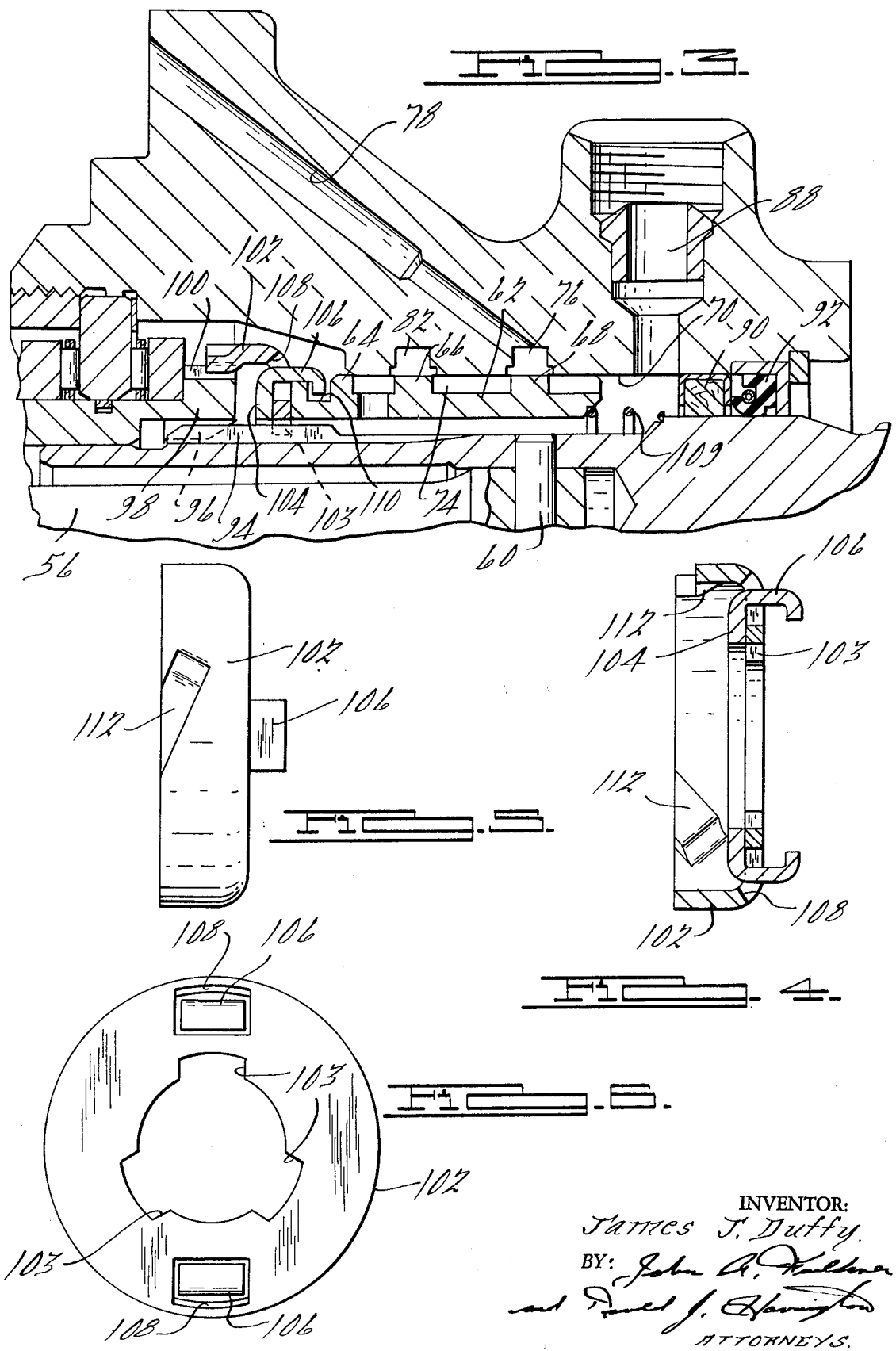

3,672,259

PRESSURE DISTRIBUTOR VALVE CONSTRUCTION FOR POWER STEERING GEAR MECHANISMS

GENERAL DESCRIPTION OF THE INVENTION

The improvements of my invention are adapted for use in a valve mechanism for a power steering gear in an automotive vehicle. A typical steering system incorporating my improvements is shown in my earlier U.S. Patent No. 3,292,499.

Steering gear mechanisms of the type shown in my earlier patent as well as steering gear mechanisms in use in certain automotive vehicles manufactured by the assignee of my invention include a power steering cylinder housing and a sector gear mounted in the housing on a sector gear shaft that extends transversely with respect to the geometric axis of the cylinder. Driven portions of the vehicle steering system are connected to the sector gear shaft. The sector gear includes gear teeth which mesh with a rack connected to or formed integrally with a linear piston mounted for reciprocating movement in the cylinder. The piston is actuated by means of a steering gear shaft concentrically disposed within the piston and mechanically connected to the piston by means of a relatively friction-free, recirculating, ball-nut connection. Torsional effort applied to the steering shaft will result in linear movement of the piston. This oscillates the sector gear and the sector gear shaft to effect steering movement on the dirigible wheels of the vehicle. The connection between the driving element of the recirculating ball-nut connection and the steering shaft includes a torsion bar which yields when steering effort is applied to the steering shaft. A spool valve element surrounding the steering shaft is positioned within the cylindrical valve chamber. External valve lands on the valve spool register with internal valve lands in the valve chamber to control pressure distribution from a pressure source to each of two pressure chambers, one being situated on either side of the piston. As the valve establishes fluid communication between the pressure passage and one pressure chamber, it also establishes communication between the exhaust region and the other pressure chamber.

An actuator hub with external helical threads registers with internal helical threads formed on a valve actuator sleeve. The valve spool is carried on the sleeve. The steering shaft is connected to the valve sleeve and the actuator hub is connected to the torque input member of the recirculating ball-nut connection. As the torsion bar yields in response to a steering effort applied to the steering shaft, relative angular displacement occurs between the actuator hub and the actuator sleeve. The helical threads then will effect axial displacement of the valve sleeve in response to relative angular displacement of the actuator hub with respect to the actuator sleeve. Valve spool displacement then results in either an increase or a decrease in the degree of communication between the pressure passage and the appropriate pressure chamber as the degree of communication between the other pressure chamber and the exhaust region is either increased or decreased, respectively. The resulting pressure differential across the piston then provides a hydrostatic power assist to the driver steering effort applied to the steering shaft during turning maneuvers of the vehicle.

According to a principal feature of my invention, I have eliminated backlash between the valve spool and the valve actuator thereby increasing the sensitivity of the power steering gear mechanism as it provides a response to a changing steering effort applied to the steering shaft by the vehicle operator. An antibacklash valve spring anchored on the steering shaft applies an axial force directly to the valve spool. No relative angular movement occurs between the members that are engaged by the valve spring.

The valve spring in certain power steering gear mechanisms now in use acts upon relatively angularly displaceable members in the valve mechanism, thereby introducing friction forces. This causes variations in the loading imposed upon the spring biased members which causes in some instances sporadic valve action and a lack of valve response to changes in steering effort applied by the operator. My improved valve mechanism overcomes this difficulty.

BRIEF DESCRIPTION OF THE FIGURES OF THE DRAWINGS

FIG. 1 shows in longitudinal cross sectional form a power steering gear mechanism embodying the improved valve system of my invention.

FIG. 2 is a cross sectional view taken along the plane of Section line 2—2 of FIG. 1.

FIG. 3 is an enlargement of the spool valve mechanism for the structure shown in FIG. 1.

FIG. 4 is a subassembly view of the valve actuator shown in FIG. 3.

FIG. 5 is an end elevation view of a portion of the valve actuator shown in FIG. 4.

FIG. 6 is an end view of the structure of FIG. 4 as seen from section line 6—6 of FIG. 4.

FIGS. 1 and 2 show at 10 a power steering housing that defines a fluid pressure cylinder 12 within which is disposed a cooperating piston assembly 14. Housing 10 is formed with an end wall 16 which cooperates with the left end 18 of the piston assembly 14 to define a first pressure chamber 20. The right hand end of the housing 10 has an opening against which is secured a valve housing 22. Housing 22 cooperates with the right hand end 24 of the piston assembly 14 to define a second pressure chamber 26.

One side of the piston assembly 14 is provided with teeth 28 which define a rack. The rack teeth engage external teeth 30 formed on sector gear 32. This gear is connected to or formed integrally with a sector gear shaft 34 which is mounted transversely with respect to the geometric axis of the piston assembly 14. The housing 10 is formed with a transverse opening at spaced locations as indicated in FIG. 2 at 36 and 38. Shaft 34 is provided with a splined end 40, which extends outwardly from the housing 10 to permit a driving connection with a driven portion of the steering system for an automotive vehicle. The other end of the shaft 34 is journaled in bearing opening 42 formed in closure member 44 which is secured within opening 36 in the housing 10. A backlash adjusting screw 46 is threadably received within an opening formed in the closure member 44 and is adapted to urge the sector gear 32 toward a zero backlash position. Sector gear teeth 30 mesh with the teeth 28 formed on the piston assembly 14, which teeth 28 are situated with a predetermined angular relationship with respect to the axis of the shaft 34 as indicated best by FIG. 2.

Piston assembly 14 is formed with a central opening 48 which is provided with an internal helical groove 50. Situated within the opening 48 is an externally threaded worm gear shaft 52. Recirculating balls 54 are received within the helical groove 50 and the external threads on the shaft 52 thereby providing a driving connection between the shaft 52 and the piston assembly 14. One end of the opening 48 receives a closure element 55 which isolates the chamber 20 from the interior opening 48.

The end of the worm gear shaft 52 is disposed within the opening 48 and is connected directly to one end of a torsion rod 56, an anchor pin 58 being provided for this purpose. The worm gear shaft 52 is formed with an internal, axially extending opening through which the torsion rod 56 is received. The other end of the torsion rod 56 is pinned to steering shaft 58 by means of a transversely exposed drive pin 60. This outer end of the rod 56 is received within a central opening formed in the steering shaft 58.

A valve spool 62 formed with an internal opening surrounds shaft 58. It is provided with external valve lands 64, 66 and 68 which register with internal valve lands formed in valve chamber 70, which is concentrically disposed with respect to the axis of the shaft 58 and the shaft 52 within the valve housing 22. A pressure fluid supply port 72 is formed in the housing 22 and is adapted to deliver fluid under pressure to an annular groove 74 defined by the lands 66 and 68. Annular groove 76 formed on the housing 22 registers with a land 68. It communicates with a right turn pressure passage 78. This passage connects with crossover passage 80 formed in the housing 10 and it communicates with pressure chamber 20 as indicated in FIG. 1.

A second annular groove 82 formed on the housing 22 registers with a land 66. It communicates with left turn pressure passage 84 which communicates with pressure chamber 26. A fluid pressure return passage 88 also is formed in the housing 22. It registers with the space surrounding the shaft 58 on the right hand side of the valve spool 62. That space communicates also with the left hand side of the valve spool 62 through the annular space between the valve spool and the centrally disposed shaft 58.

Upon movement of the valve spool in a right hand direction, communication between port 72 and groove 76 is increased and the degree of communication between annular groove 82 and exhaust port 88 is decreased. This results in an increased pressure in pressure chamber 20 thus effecting a right hand turn. At this time the degree of communication between annular groove 82 and pressure port 72 is decreased while the degree of communication between groove 82 and the exhaust port 88 is increased. This results in a decrease in the pressure in chamber 26. Conversely, if the valve were to be shifted in the opposite direction, the pressure balance would be changed so that a pressure build-up would occur in chamber 26 and a pressure decrease would occur in chamber 20 thereby causing the piston to move in a direction that corresponds to a left turn on the vehicle.

The right hand end of the shaft 58 is journaled in the central opening formed in the valve housing 22 by means of bearing 90. The valve opening is closed by seal 92.

The worm gear shaft is provided with internal spline teeth which register with external spline teeth 94 formed on the shaft 58. This provides a positive connection which is identified by reference character 96. A plurality of helical threads, preferably three in number, are formed on the outer periphery of the end portion 98 of the worm gear shaft as indicated at 100. These teeth register with internal teeth formed in actuator ring 102. The actuator ring is provided with a central opening having internal drive spline teeth 103 which register with external splines 94 thereby providing a positive driving connection between the actuator ring 102 and the shaft 58.

A complementary actuator ring 104 is situated directly adjacent the actuator ring 102. It includes two projections, one of which is shown at 106. These extend in an axial direction through openings 108 in the ring 102. The projections 106 are turned inwardly so that they register with an external peripheral groove 110 in the valve spool 62.

A compression spring 109 is disposed between the valve spool 62 and a shoulder formed on shaft 58 as indicated in FIG. 3. This is an antibacklash spring which normally urges the valve spool 62 against the actuator ring 102, which in turn bears against the drive side of the helical spline teeth 100.

The spline teeth of the actuator ring 102 are best illustrated in FIGS. 4 and 5. They are identified by reference characters 112. By preference they are formed by stamping with a die having internal threads during the stamping operation of the actuator ring 102.

When torque is applied to the steering shaft 58, it is distributed through the torsion rod directly to the worm gear shaft 52. This causes the torsion rod to deflect torsionally. As this deflection takes place the actuator ring 102 tends to be threaded over the external helical threads 100 on the end portion 98 of the worm gear shaft. This causes axial displacement of the actuator ring 102 and corresponding axial displacement of valve spool 62. If a left hand steering effort is applied to the shaft 58, the actuator ring 102 tends to shift in a left hand direction as it is driven by the drive spline teeth 103 by the shaft 58. Spring 109 which tends to keep the spool in engagement with the ring 102 causes the spool 62 to shift in a left hand direction thereby causing a pressure build-up to occur in chamber 20 and a pressure reduction to occur in chamber 26, as explained previously.

If torque is applied to the shaft 58 in the opposite direction, the threading action of the actuator ring 102 occurs in the opposite sense thereby causing it to shift in a right hand direction as viewed in FIG. 3. The axial motion of the ring 102 is transferred directly to the valve spool 62 against the opposing influence of the spring 109 thereby causing a pressure build-up in chamber 26 and a pressure reduction in chamber 20, as explained previously.

If the valve spool should stick for some reason while the actuator ring 102 is being threaded over the vehicle spline teeth 100 in a left hand direction, the internal shoulder on the auxiliary ring 106, which registers with the groove 110, will force the valve spool 62 to follow the motion of the ring 102.

Unlike certain prior art constructions, there is no relative angular motion between the two ends of the valve spring. This creates a precise valve function so that the response of the pressure operated servo motor is more accurately controlled. The response also is improved because of the zero backlash condition that is achieved by reason of the fact that the valve spool 62 is urged into positive engagement with the ring 102 at all times under the influence of the spring 109 and also because the internal spline teeth on the ring 102 engages at all times the drive side of the external spline teeth 100.

It is possible with this arrangement to provide metering lands on the valve spool 62 of square shaped rather than of conventional chamfered contour. The cooperating internal valve lands in the valve chamber 70 also are square shaped and provide sharp corners which register with the sharp valve land corners on the spool 62. This characteristic further reduces the fluid flow due to leakage. Also the simplified actuator design for the valve makes it possible to use a smaller diameter valve spool which in turn further reduces the valve leakage.

Having thus described a preferred embodiment of my invention, what I claim and desire to secure by U.S. Letters Patent is:

1. A power steering gear assembly comprising a cylinder, a piston mounted for reciprocating movement in said cylinder, a driven shaft mounted for rotary motion about an axis transversely disposed with respect to the direction of motion of said piston, a geared connection between said piston and said driven shaft, said driven shaft being adapted to be connected to driven portions of a power steering system, a driving shaft disposed within said piston, a threaded connection between said driving shaft and said piston whereby rotary motion of said driving shaft produces an axial force on said piston, a steering shaft, a torsion rod defining in part a motion transmitting connection from said steering shaft to said driven shaft, a valve spool surrounding said steering shaft, a valve housing, a valve chamber in said housing receiving said valve spool, said valve spool having formed thereon valve lands adapted to register with internal valve lands in said valve chamber which are in fluid communication with said cylinder on either side of said piston, a spool valve actuator ring having a marginal portion surrounding one end of said driving shaft, a sliding connection between said steering shaft and said ring including registering teeth on said steering shaft and on said ring, said teeth extending generally axially in the direction of the axis of said steering shaft, a threaded connection between a portion of said driving shaft and said actuator ring whereby rotary motion of said actuator ring relative to said driving shaft effects axial motion of said actuator ring relative to said steering shaft, and a valve spring means for biasing said valve spool against said actuator ring whereby said valve spool follows the motion of said actuator ring upon deflection of said torsion rod.

2. The combination set forth in claim 1 wherein said spring means comprises a compression spring having one end thereof anchored against said steering shaft and the other end thereof engaging said valve spool, said compression spring biasing said valve spool directly against said actuator ring which in turn engages the drive side of the threads of said driving shaft thereby eliminating backlash as said valve spool responds to torque applied to said steering shaft.

3. The combination set forth in claim 1 wherein said actuator ring includes a complementary actuator means engageable with said valve spool and carried by said actuator ring for forcing said valve spool to follow the axial motion of said actuator ring during operation.

4. The combination set forth in claim 2 wherein said actuator ring includes a complementary actuator means engageable with said valve spool and carried by said actuator ring for forcing said valve spool to follow the axial motion of said actuator ring during operation.

5. The combination set forth in claim 1 wherein said valve chamber has formed therein valve grooves that define valve lands which in turn register with external valve lands on said valve spool, said valve spool and the cooperating valve lands of said valve chamber having relatively sharp edge margins thereby reducing the circulating fluid flow rate.

6. The combination set forth in claim 2 wherein said valve chamber has formed therein valve grooves that define valve lands which in turn register with external valve lands on said valve spool, said valve spool and the cooperating valve lands of said valve chamber having relatively sharp edge margins thereby reducing the circulating fluid flow rate.

7. The combination set forth in claim 3 wherein said valve chamber has formed therein valve grooves that define valve lands which in turn register with external valve lands on said valve spool, said valve spool and the cooperating valve lands of said valve chamber having relatively sharp edge margins thereby reducing the circulating fluid flow rate.

8. The combination set forth in claim 4 wherein said valve chamber has formed therein valve grooves that define valve lands which in turn register with external valve lands on said valve spool, said valve spool and the cooperating valve lands of said valve chamber having relatively sharp edge margins thereby reducing the circulating fluid flow rate.

* * * * *